US012768215B2

(12) United States Patent
Lingle et al.

(10) Patent No.: US 12,768,215 B2
(45) Date of Patent: Oct. 20, 2026

(54) VACUUM INSULATED PANEL CONFIGURED FOR MEASUREMENT OF PRESSURE IN EVACUATED GAP

(71) Applicant: LuxWall, Inc., Ypsilanti, MI (US)

(72) Inventors: Philip J. Lingle, Temperance, MI (US); Scott V. Thomsen, Glen Arbor, MI (US)

(73) Assignee: LuxWall, Inc., Ypsilanti, MI (US)

( * ) Notice: Subject to any disclaimer, the term of this patent is extended or adjusted under 35 U.S.C. 154(b) by 288 days.

(21) Appl. No.: 18/786,810

(22) Filed: Jul. 29, 2024

(65) Prior Publication Data

US 2026/0028872 A1 Jan. 29, 2026

(51) Int. Cl.
*E06B 3/66* (2006.01)
*G01L 21/24* (2006.01)

(52) U.S. Cl.
CPC ............ *E06B 3/6612* (2013.01); *G01L 21/24* (2013.01)

(58) Field of Classification Search
CPC ............................... E06B 3/6612; G01L 21/24
See application file for complete search history.

(56) References Cited

U.S. PATENT DOCUMENTS 3,433,611 A 3/1969 Saunders et al.
3,583,227 A 6/1971 Machler
5,124,185 A 6/1992 Kerr et al.
5,657,607 A 8/1997 Collins
5,664,395 A 9/1997 Collins
5,935,702 A 8/1999 Macquart et al.
6,042,934 A 3/2000 Guiselin et al.
6,322,881 B1 11/2001 Boire et al.
6,352,749 B1 3/2002 Aggas
6,429,561 B1 8/2002 Davis et al.
6,533,632 B1 3/2003 Dynka
6,558,494 B1 5/2003 Wang et al.
6,641,689 B1 11/2003 Aggas
6,946,171 B1 9/2005 Aggas
7,045,181 B2 5/2006 Yoshizawa et al.
7,115,308 B2 10/2006 Amari et al.
(Continued)

FOREIGN PATENT DOCUMENTS

DE 10 2007 062 481 6/2009
DE 102007062481 A1 * 6/2009 ......... E06B 3/66304
(Continued)

OTHER PUBLICATIONS

Machine translation of DE 1020070622481 (Year: 2007).*
(Continued)

*Primary Examiner* — Nathaniel J Kolb
(74) *Attorney, Agent, or Firm* — Nixon & Vanderhye P.C.

(57) ABSTRACT

A vacuum insulating panel includes first and second substrates (e.g., glass substrates), a hermetic edge seal, a pump-out port, and spacers sandwiched between at least the two substrates. The gap between the substrates may be at a pressure less than atmospheric pressure to provide insulating properties. A sensor body (e.g., spinnable magnetic body, which may be substantially spherical in shape) is provided at least partially in a recess defined in at least one of the substrates, and is configured to be spun at a high rate of speed in order to measure a pressure of the recess and/or gap between the substrates.

57 Claims, 10 Drawing Sheets

(56) References Cited

U.S. PATENT DOCUMENTS

| | | | |
|---|---|---|---|
| 7,314,668 B2 | 1/2008 | Lingle et al. | |
| 7,342,716 B2 | 3/2008 | Hartig | |
| 7,407,423 B2 | 8/2008 | Aitken et al. | |
| 7,425,166 B2 | 9/2008 | Burt et al. | |
| 7,560,402 B2 | 7/2009 | Thomsen | |
| 7,632,571 B2 | 12/2009 | Hartig et al. | |
| 7,858,193 B2 | 12/2010 | Ihlo et al. | |
| 7,919,157 B2 | 4/2011 | Cooper | |
| 8,490,434 B2 | 7/2013 | Watanabe et al. | |
| 8,500,933 B2 | 8/2013 | Cooper | |
| 8,590,343 B2 | 11/2013 | Wang | |
| 8,821,999 B2 | 9/2014 | Grzybowski et al. | |
| 8,833,105 B2 | 9/2014 | Dennis et al. | |
| 9,169,155 B2 | 10/2015 | Dennis et al. | |
| 9,290,984 B2 | 3/2016 | Hogan et al. | |
| 9,388,628 B2 | 7/2016 | Petrmichl et al. | |
| 9,428,952 B2 | 8/2016 | Dennis et al. | |
| 9,441,416 B2 | 9/2016 | Veerasamy et al. | |
| 9,458,052 B2 | 10/2016 | Dennis | |
| 9,593,527 B2 | 3/2017 | Hogan et al. | |
| 9,752,375 B2 | 9/2017 | Jones | |
| 9,776,910 B2 | 10/2017 | Dennis | |
| 9,822,580 B2 | 11/2017 | Cooper et al. | |
| 9,908,811 B2 | 3/2018 | Gross et al. | |
| 10,011,525 B2 | 7/2018 | Logunov et al. | |
| 10,017,417 B2 | 7/2018 | Dejneka et al. | |
| 10,087,676 B2 | 10/2018 | Dennis | |
| 10,107,028 B2 | 10/2018 | Dennis | |
| 10,125,045 B2 | 11/2018 | Dennis | |
| 10,153,389 B2 | 12/2018 | Godeke et al. | |
| 10,267,085 B2 | 4/2019 | Dennis et al. | |
| 10,280,680 B2 | 5/2019 | Veerasamy et al. | |
| 10,421,684 B2 | 9/2019 | Hogan et al. | |
| 10,435,938 B2 | 10/2019 | Dennis et al. | |
| 10,465,433 B2 | 11/2019 | Hogan et al. | |
| 10,731,403 B2 | 8/2020 | Krisko et al. | |
| 10,752,535 B2 | 8/2020 | Dennis | |
| 10,829,984 B2 | 11/2020 | Dennis et al. | |
| 10,858,880 B2 | 12/2020 | Dennis | |
| 10,954,160 B2 | 3/2021 | Streltsov et al. | |
| 11,014,847 B2 | 5/2021 | Dennis | |
| 11,028,009 B2 | 6/2021 | Dennis | |
| 11,124,450 B2 | 9/2021 | Miki et al. | |
| 11,285,703 B2 | 3/2022 | Jorgensen et al. | |
| 2009/0155555 A1 | 6/2009 | Botelho et al. | |
| 2012/0131959 A1 | 5/2012 | No et al. | |
| 2012/0202049 A1 | 8/2012 | Valladeau et al. | |
| 2013/0101759 A1 | 4/2013 | Jones | |
| 2013/0291644 A1 | 11/2013 | Wu et al. | |
| 2016/0065098 A1 | 3/2016 | Stipe | |
| 2016/0297706 A1 | 10/2016 | Naito et al. | |
| 2016/0320259 A1 | 11/2016 | Dorr | |
| 2018/0238104 A1 | 8/2018 | Mikkelsen et al. | |
| 2021/0254395 A1 | 8/2021 | Nielsen et al. | |
| 2021/0262279 A1 | 8/2021 | Hedeby et al. | |
| 2021/0270084 A1 | 9/2021 | Abe et al. | |
| 2022/0025697 A1 | 1/2022 | Nielsen | |
| 2022/0074258 A1 | 3/2022 | Andersen et al. | |
| 2022/0235601 A1 | 7/2022 | Krisko et al. | |

FOREIGN PATENT DOCUMENTS

| | | | |
|---|---|---|---|
| EP | 3 754 145 A1 | 12/2020 | |
| KR | 20170128999 A * | 11/2017 | .............. G01L 11/02 |
| WO | WO-9826264 A1 * | 6/1998 | ............. G01L 21/24 |

OTHER PUBLICATIONS

Machine translation of KR 20170128999 (Year: 2017).*
Machine translation of WO 9826264 (Year: 1998).*
Ph-instruments GmbH website re SRG technology as of Jul. 23, 2024 (Jul. 23, 2024).
U.S. Appl. No. 18/377,335, filed Oct. 6, 2023.
U.S. Appl. No. 18/517,044, filed Nov. 22, 2023.
U.S. Appl. No. 18/513,944, filed Nov. 20, 2023.
U.S. Appl. No. 18/510,777, filed Nov. 16, 2023.
U.S. Appl. No. 18/616,420, filed Mar. 26, 2024.
U.S. Appl. No. 18/636,472, filed Apr. 16, 2024.
U.S. Appl. No. 18/632,364, filed Apr. 11, 2024.
U.S. Appl. No. 18/617,736, filed Mar. 27, 2024.
U.S. Appl. No. 18/619,266, filed Mar. 28, 2024.
U.S. Appl. No. 18/623,109, filed Apr. 1, 2024.
U.S. Appl. No. 18/626,359, filed Apr. 4, 2024.
U.S. Appl. No. 18/633,733, filed Apr. 12, 2024.
U.S. Appl. No. 18/629,996, filed Apr. 9, 2024.
U.S. Appl. No. 18/650,204, filed Apr. 30, 2024.
U.S. Appl. No. 18/654,040, filed May 3, 2024.
U.S. Appl. No. 18/664,462, filed May 15, 2024.
U.S. Appl. No. 18/668,374, filed May 20, 2024.
International Search Report dated Mar. 6, 2025 for PCT Application No. PCT/US2025/010471.
Written Opinion dated Mar. 6, 2025 for PCT Application No. PCT/US2025/010471.
Ph-Instruments Gmbh: "SRG technology for vacuum-insulated-glazing R&D and QC"; Jul. 18, 2024.

* cited by examiner

VACUUM INSULATED PANEL CONFIGURED FOR MEASUREMENT OF PRESSURE IN EVACUATED GAP

FIELD

Certain example embodiments are generally related to vacuum insulated devices such as vacuum insulating panels that may be used for windows or the like, and/or methods of making same.

BACKGROUND AND SUMMARY

Vacuum insulated panels are known in the art. For example, and without limitation, vacuum insulating panels are disclosed in U.S. Pat. Nos. 5,124,185, 5,657,607, 5,664,395, 7,045,181, 7,115,308, 8,821,999, 10,153,389, and 11,124,450, the disclosures of which are all hereby incorporated herein by reference in their entireties.

As discussed and/or shown in one or more of the above patent documents, a vacuum insulating panel typically includes an outboard substrate, an inboard substrate, a hermetic edge seal, a sorption getter, a pump-out port, and spacers (e.g., pillars) sandwiched between at least the two substrates. The gap between the substrates may be at a pressure less than atmospheric pressure to provide insulating properties. Providing a vacuum in the space between the substrates reduces conduction and convection heat transport, and thus provides insulating properties. For example, a vacuum insulating panel provides thermal insulation resistance by reducing convective energy between the two substrates, reducing conductive energy between the two transparent substrates, and reducing radiative energy with a low-emissivity (low-E) coating provided on one of the substrates. Vacuum insulating panels may be used in window applications (e.g., for commercial and/or residential windows), and/or for other applications such as commercial refrigeration and consumer appliance applications.

Conventionally, performance of a manufactured vacuum insulating panel has been determined by measuring the R-value of the panel using a guarded hot plate apparatus. With a guarded hot plate apparatus, upper and lower plates are respectively located on opposite sides of the panel for measuring the R-value of the panel. Unfortunately, this takes a long time (e.g., from about forty to sixty minutes) which can significantly slow down a commercial production process. Thus, there exists a need in the art for measuring performance of a manufactured vacuum insulating panel that does not take as long and/or which does not cause an undue burden on a commercial production process.

Gauges for measuring pressure are known in the art. For example, see U.S. Pat. Nos. 3,583,227, 6,429,561, 2013/0291644, 2016/0065098, and 2016/0320259, the disclosures of which are hereby incorporated herein by reference in their entireties. For example, US 2013/0291644 in paragraph describes a spinning rotor viscosity gauge comprising a sensor, two vertical stability control coils, a steel pipe, and a steel ball. The steel ball is placed in the pipe, and an end of the pipe is sealed, and the ball is suspended during use between two magnets. The ball is accelerated by acceleration coils, and then the acceleration coils are turned off, and the ball slows down gradually due to the viscosity of air. The change in rotational speed of the ball is used to calculate the numeral value of the vacuum or air pressure.

Conventional spinning rotor gauges, for measuring pressure, are commercially available, such as from ph-instruments GmbH headquartered in Austria. Such gauges operate based on molecular momentum transfer between residual gases in a vacuum chamber and the deceleration rate of a free spinning magnetic ball bearing which has a certain surface quality. This company describes on its website that a spinning rotor gauge (SRG) includes a measuring head, a control/read out unit, and a stainless steel measuring tube containing a 4.5 mm ball-bearing serving as the pressure sensor. The measuring head contains a magnet and coil system for levitation, oscillation damping, acceleration, speed sensing of the sensor ball, and also includes a temperature sensor. The tube is sealed at one end while the other is attached to a vacuum chamber such as by welding or flange connection. During measurement, the sensor ball is levitated by a magnetic field and rotates. The sensor ball is accelerated to a speed of more than 600 rps and then allowed to coast. The sensor ball experiences a drag caused by tangential momentum transfer from incident gas molecules inside the measuring tube (molecular drag). The angular speed of the sensor ball is measured continuously to determine its rate of slowing down. The relative deceleration rate of the ball is proportional to pressure. Thus, the change in rotational speed of the ball as it slows down is used to calculate the numeral value of the vacuum or air pressure.

Unfortunately, such conventional pressure gauges cannot measure the pressure of the evacuated gap inside a sealed vacuum insulating panel.

In certain example embodiments, there is provided a system for measuring the pressure of the evacuated gap inside a sealed vacuum insulating panel, in an efficient manner. In certain example embodiments, a sensor body (e.g., spinnable magnetic body, which may be substantially spherical in shape) is provided at least partially in a recess, and is configured to be spun at a high rate of speed in order to measure a pressure of the evacuated gap between the substrates. The pressure of the evacuated gap is indicative of the R-value of the panel. Therefore, measuring pressure of the manufactured sealed panel indicates can be used as a quality control factor for demonstrating whether performance of the manufactured sealed panel has a sufficiently low pressure in the evacuated gap (and thus whether it would be expected to have a sufficiently high R-value). Thus, there may be provided a system for measuring performance (e.g., pressure, which is indicative of R-value) of a manufactured and sealed vacuum insulating panel that does not take too long and/or which does not cause an undue burden on a commercial production process.

In certain example embodiments, there may be provided a a vacuum insulating panel comprising: a first substrate; a second substrate; a plurality of spacers provided in a gap between at least the first and second substrates, wherein the gap is at pressure less than atmospheric pressure; a seal at least partially located between at least the first and second substrates; a sensor body, comprising magnetic material, at least partially located in a recess defined in at least one of the substrates so that the sensor body is positioned at least partially between at least the first and second substrates; wherein the sensor body is configured to be rotated and/or spun to determine a pressure in the gap and/or recess.

In certain example embodiments, there may be provided a vacuum insulating panel comprising: a first glass substrate; a second glass substrate; a plurality of spacers provided in a gap between at least the first and second glass substrates, wherein the gap is at pressure less than atmospheric pressure; a seal at least partially located between at least the first and second glass substrates; a sensor body, comprising magnetic material, at least partially located between at least the first and second glass substrates; wherein the sensor body is configured to be rotated and/or spun to determine a pressure in the gap.

In certain example embodiments, there may be provided a method of determining pressure in a vacuum insulating panel comprising: a first substrate, a second substrate, a plurality of spacers provided in a gap between at least the first and second substrates, wherein the gap is at pressure less than atmospheric pressure, and a seal at least partially located between at least the first and second substrates, the method comprising: levitating and spinning a sensor body, comprising magnetic material, located at least partially in a recess defined in at least one of the substrates so as to spin the sensor body in a location which is exposed to the gap and which is at least partially provided in the recess; allowing the spinning of the sensor body to slow down; and determining a pressure in the gap and/or recess of the vacuum insulated panel based on at least a rate at which the spinning of sensor body slows down and/or decelerates.

In certain example embodiments, there may be provided a system for measuring pressure in an evacuated gap of a vacuum insulating panel, the system comprising: a substantially C-shaped head comprising coils and magnets and first and second arms, wherein the first and second arms are configured to be located on opposite sides of a portion of a vacuum insulating panel comprising first and second substantially parallel substrates with a gap therebetween at pressure less than atmospheric pressure; wherein the coils and/or magnets are configured to levitate and spin a sensor body, comprising magnetic material, located in the gap between the substrates; and at least one processor, comprising processing circuitry, individually and/or collectively configured to determine a pressure in the gap and of the vacuum insulated panel based on at least a rate at which spinning of sensor body slows down and/or decelerates.

Technical advantages may include one or more of: a system for measuring performance (e.g., pressure, which is indicative of R-value) of a manufactured and sealed vacuum insulating panel that does not take too long and/or which does not cause an undue burden on a commercial production process; a system which allows for the pressure (and thus performance) of a sealed vacuum insulating panel to be measured in its sealed state; a system which allows for the pressure of a sealed vacuum insulating panel to be measured at any point in time after its manufacture including the potential to be measured years later; and/or a system for improving quality control of a commercial vacuum insulating glass manufacturing process in an efficient manner.

BRIEF DESCRIPTION OF THE DRA WINGS

These and/or other aspects, features, and/or advantages will become apparent and more readily appreciated from the following description of various example embodiments, taken in conjunction with the accompanying drawings. Thicknesses of layers/elements, and sizes of components/elements, are not necessarily drawn to scale or in actual proportion to one another, but rather are shown as example representations. Like reference numerals may refer to like parts throughout the several views. Each embodiment herein may be used in combination with any other embodiment(s) described herein.

DETAILED DESCRIPTION

Figure 1:
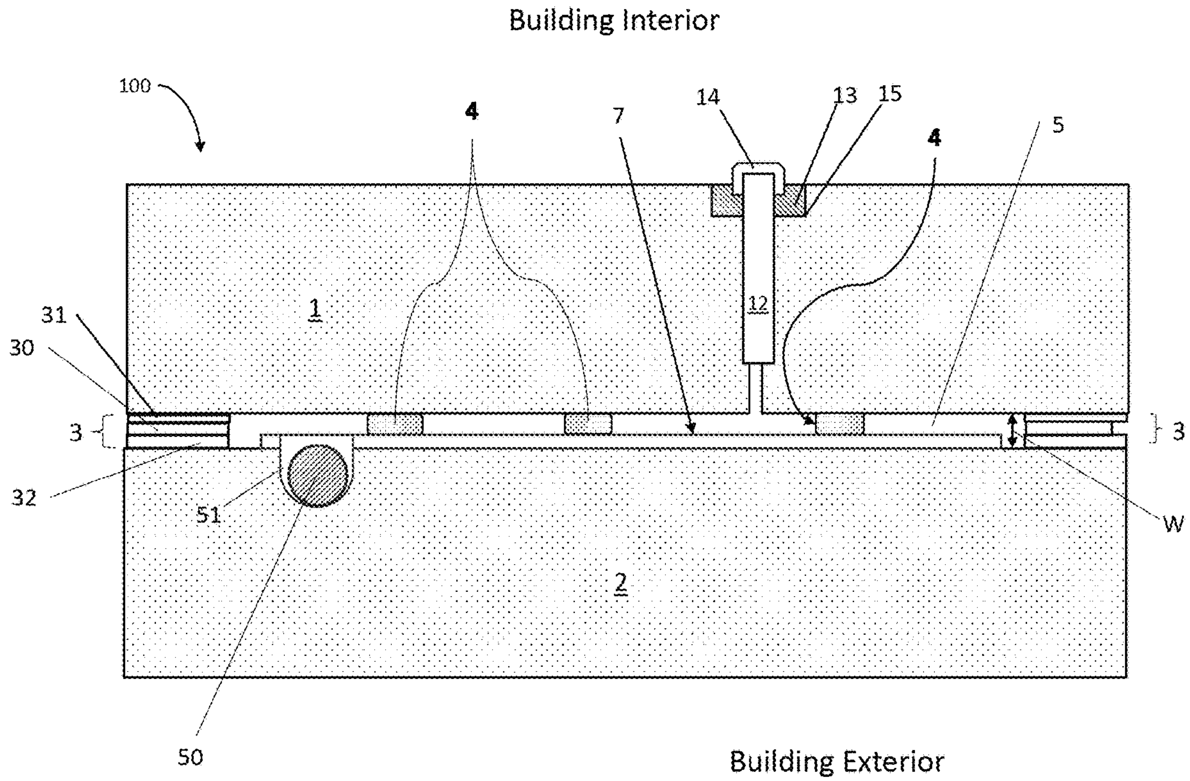
FIG. 1 is a side cross sectional view of a vacuum insulating unit/panel according to an example embodiment, such as taken along Section Line A-A in FIG. 2.

The following detailed structural and/or functional description(s) is/are provided as examples only, and various alterations and modifications may be made. The example embodiments herein do not limit the disclosure and should be understood to include all changes, equivalents, and replacements within ideas and the technical scope herein. Hereinafter, certain examples will be described in detail with reference to the accompanying drawings. When describing various example embodiments with reference to the accompanying drawings, like reference numerals may refer to like components and a repeated description related thereto may be omitted.

Figure 2:
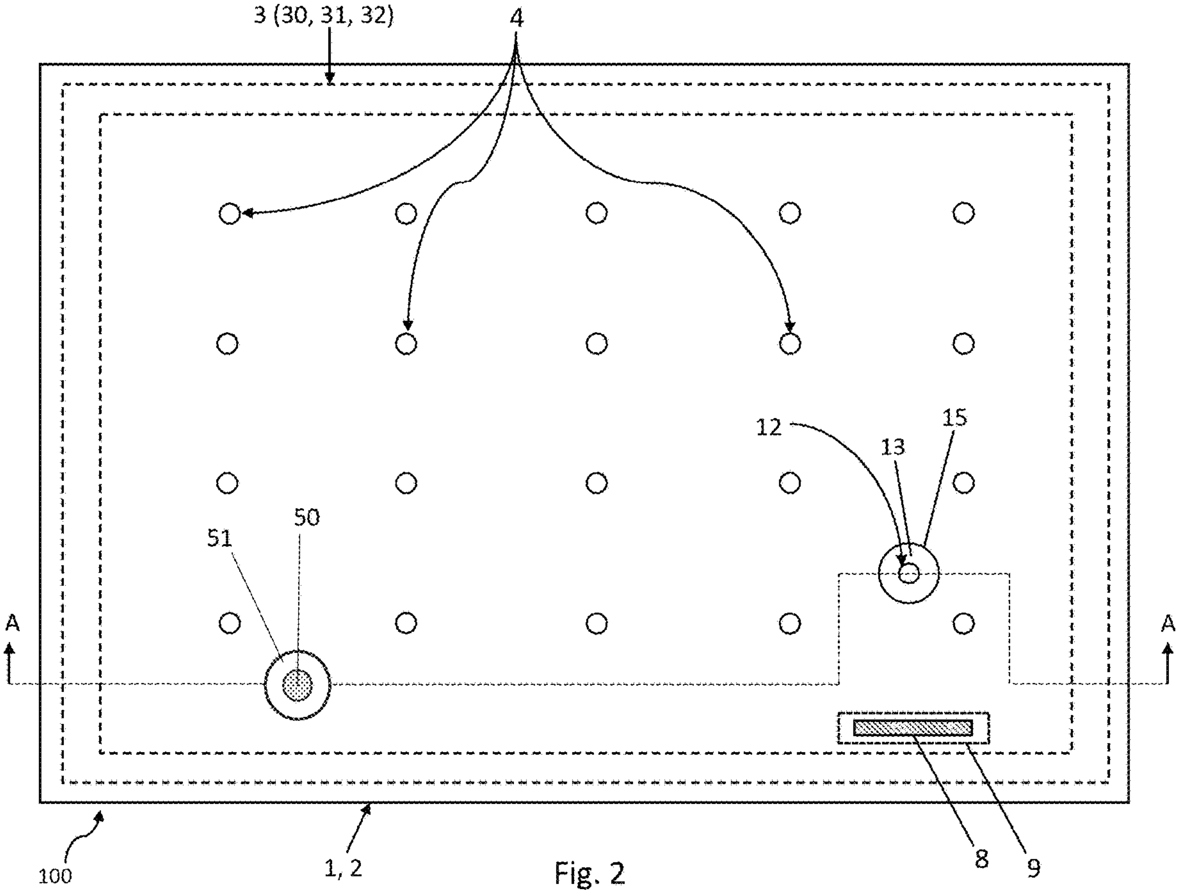
FIG. 2 is a schematic top view of a vacuum insulating unit/panel according to an example embodiment, which may be used in combination with any embodiment herein including those of FIGS. 1-9.
Figure 6:
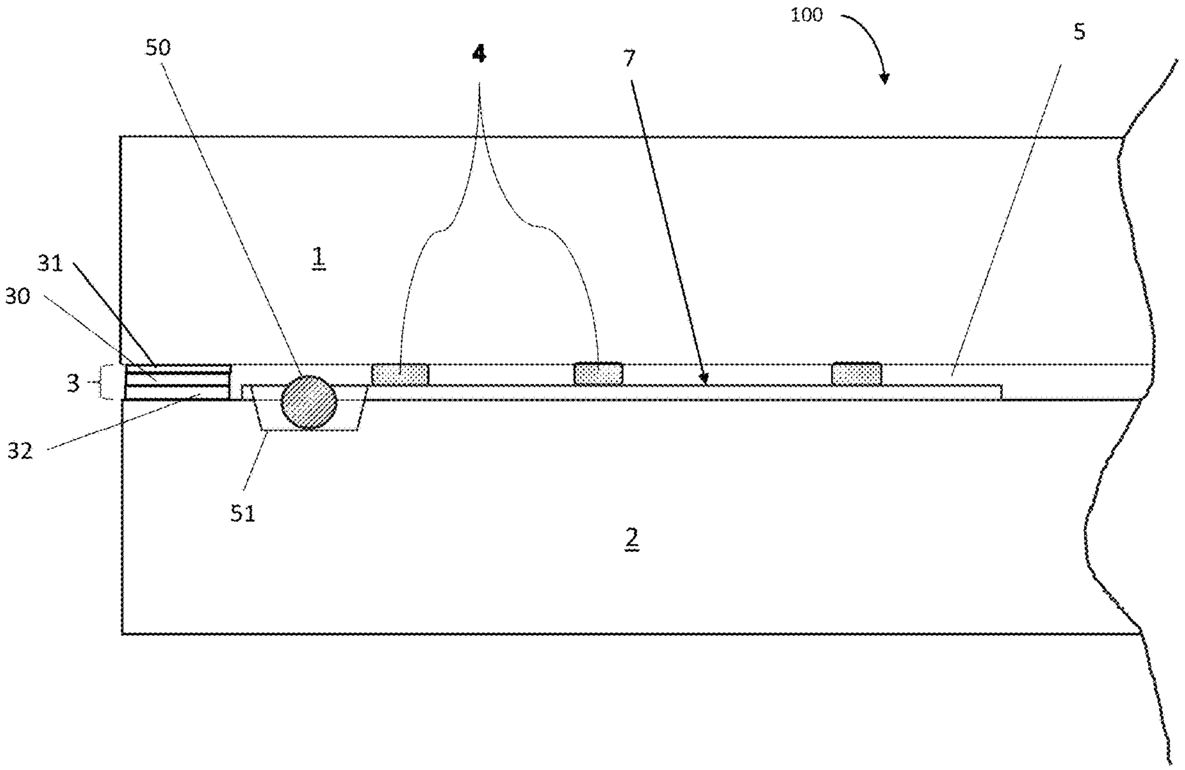
FIG. 6 is a side cross sectional view of a portion of a vacuum insulating unit/panel according to an example embodiment (e.g., which may be the panel of any of FIGS. 1, 2 and/or 4) according to an example embodiment, which may be used in combination with any embodiment herein.
Figure 7:
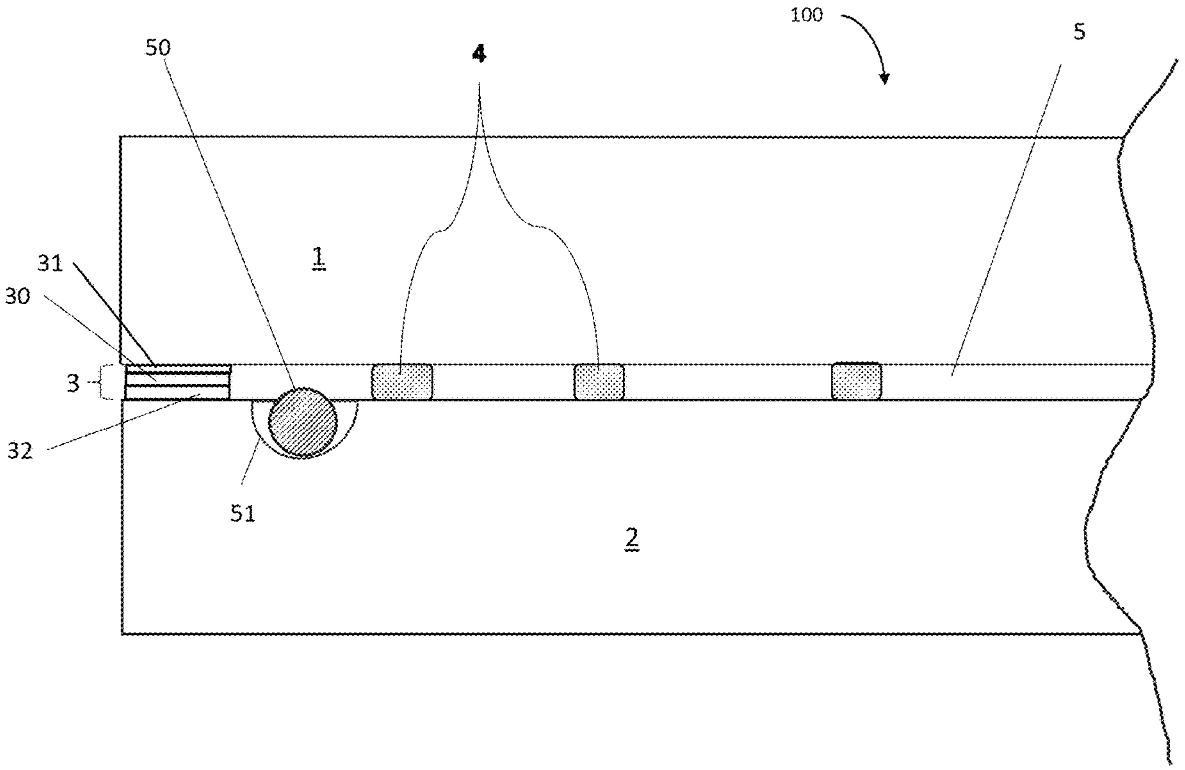
FIG. 7 is a side cross sectional view of a portion of a vacuum insulating unit/panel according to an example embodiment (e.g., which may be the panel of any of FIGS. 1, 2 and/or 4) according to an example embodiment, which may be used in combination with any embodiment herein.
Figure 8:
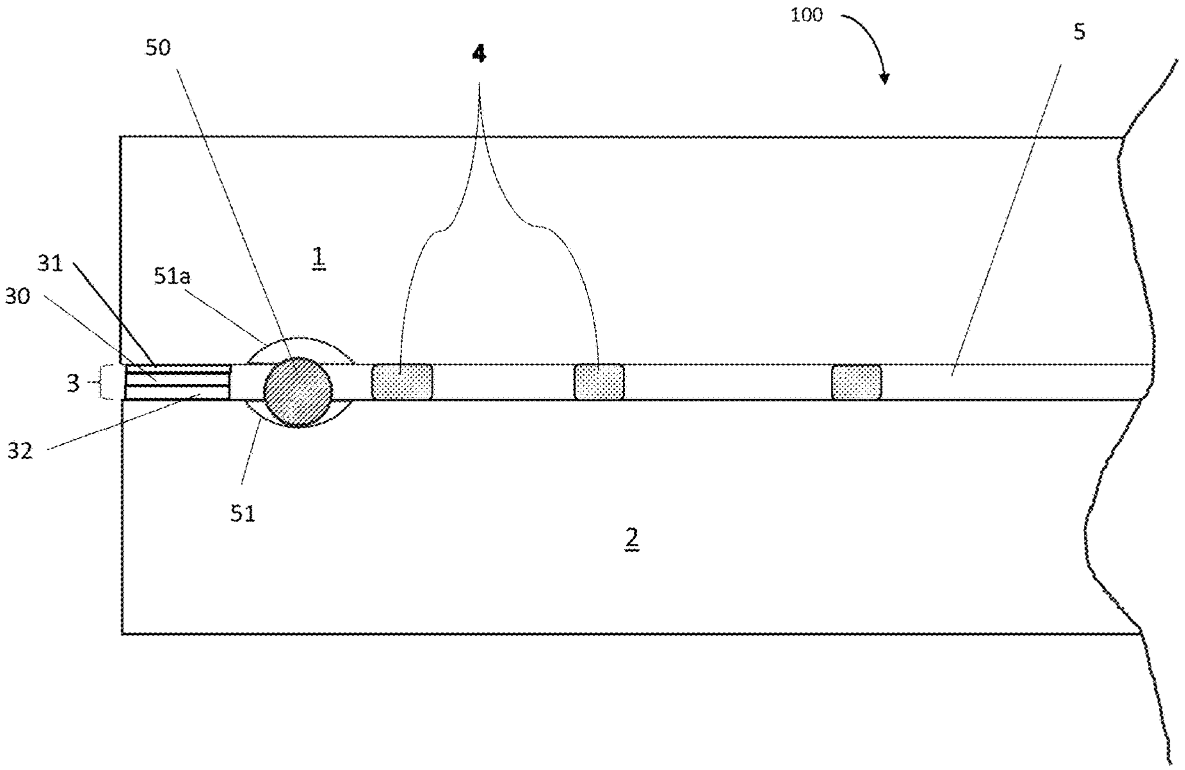
FIG. 8 is a side cross sectional view of a portion of a vacuum insulating unit/panel according to an example embodiment (e.g., which may be the panel of any of FIGS. 1, 2 and/or 4) according to an example embodiment, which may be used in combination with any embodiment herein.
Figure 9:
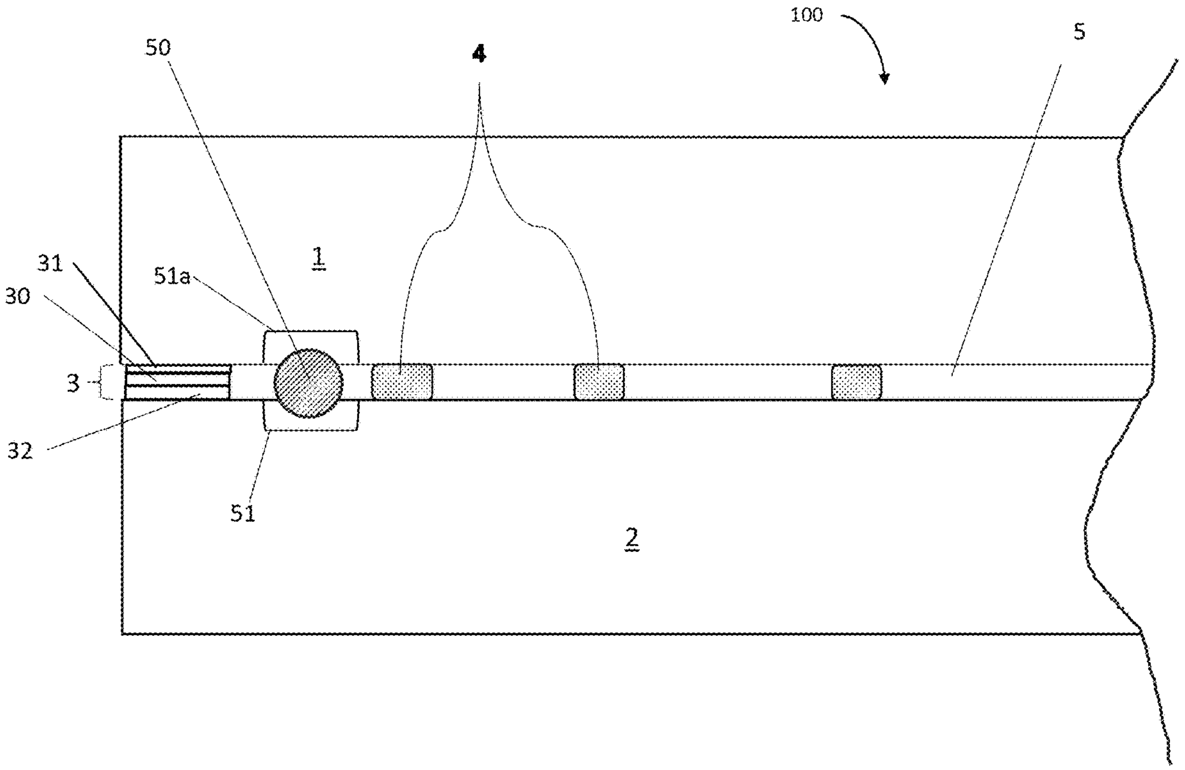
FIG. 9 is a side cross sectional view of a portion of a vacuum insulating unit/panel according to an example embodiment (e.g., which may be the panel of any of FIGS. 1, 2 and/or 4) according to an example embodiment, which may be used in combination with any embodiment herein.

FIG. 2 is a schematic top view of a vacuum insulating unit/panel 100 according to an example embodiment, which may be used in combination with any embodiment herein. And FIG. 1 is a side cross sectional view illustrating a vacuum insulating panel 100 according to various example embodiments, which may be taken along section line Section Line A-A in FIG. 2. FIGS. 3 and 5-9 are side cross sectional views of a portion of example vacuum insulating units/panels according to various example embodiments (e.g., which may be the panel of FIGS. 1, 2 and/or 4) according to an example embodiment, which may be used in combination with any embodiment herein. FIGS. 1 and 3-7 illustrate a sensor body recess 51 in one of the substrates 1, whereas FIGS. 8-9 illustrate example embodiments where opposing/overlapping sensor body recesses 51 and 51*a* are provided in both substrates 1 and 2 so as to at least partially overlap each other.

Figure 3:
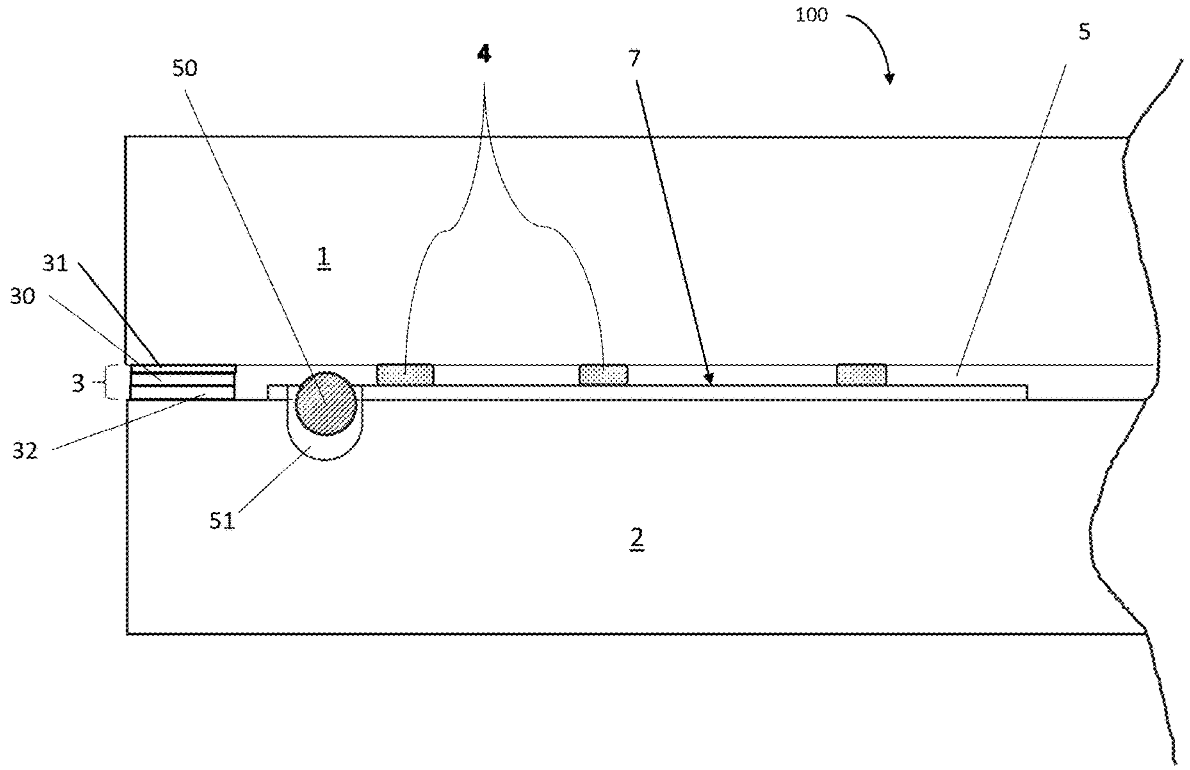
FIG. 3 is a side cross sectional view of a portion of a vacuum insulating unit/panel according to an example embodiment (e.g., which may be the panel of FIGS. 1, 2 and/or 4) according to an example embodiment, which may be used in combination with any embodiment herein.
Figure 4:
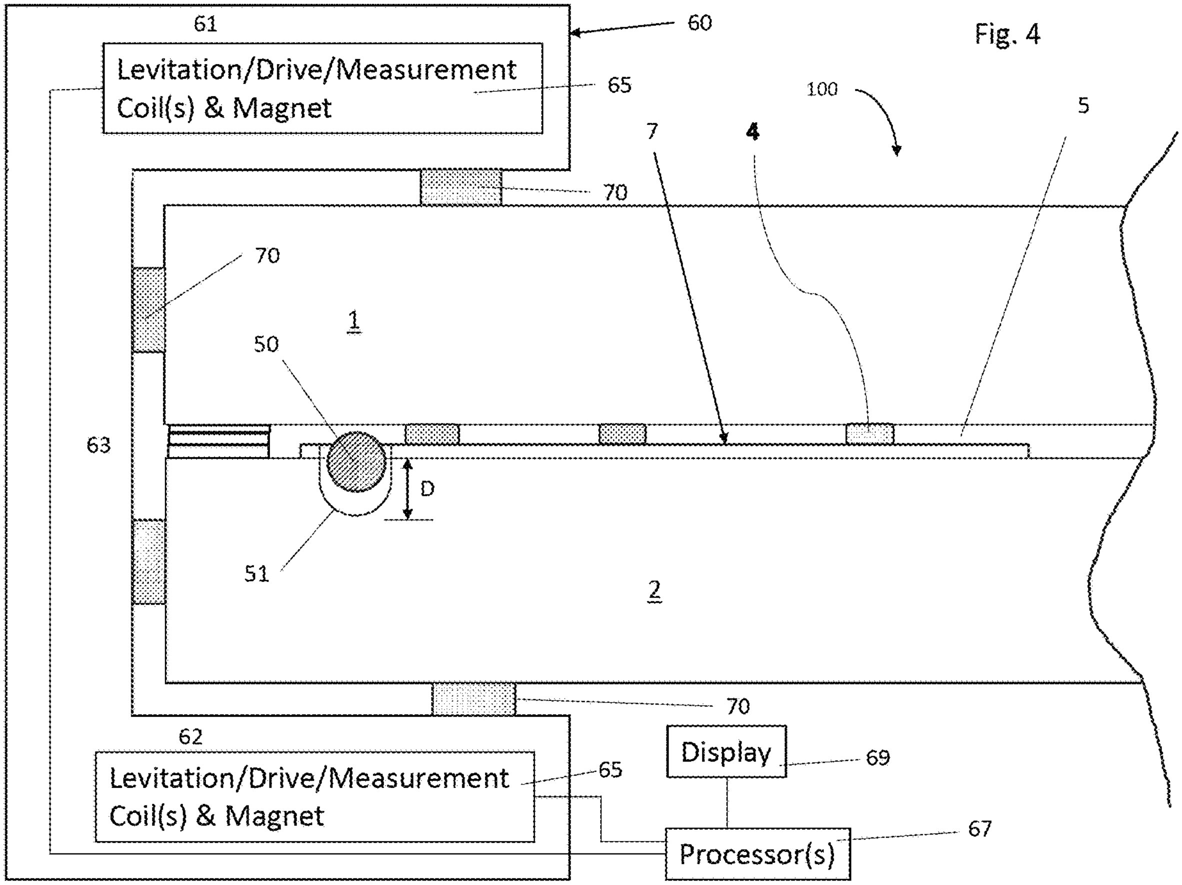
FIG. 4 is a side cross sectional view of a system for measuring the pressure of the evacuated gap of the vacuum insulating panel of any of FIGS. 1-3 and/or 5-9 according to an example embodiment, which may be used in combination with any embodiment herein.
Figure 5:
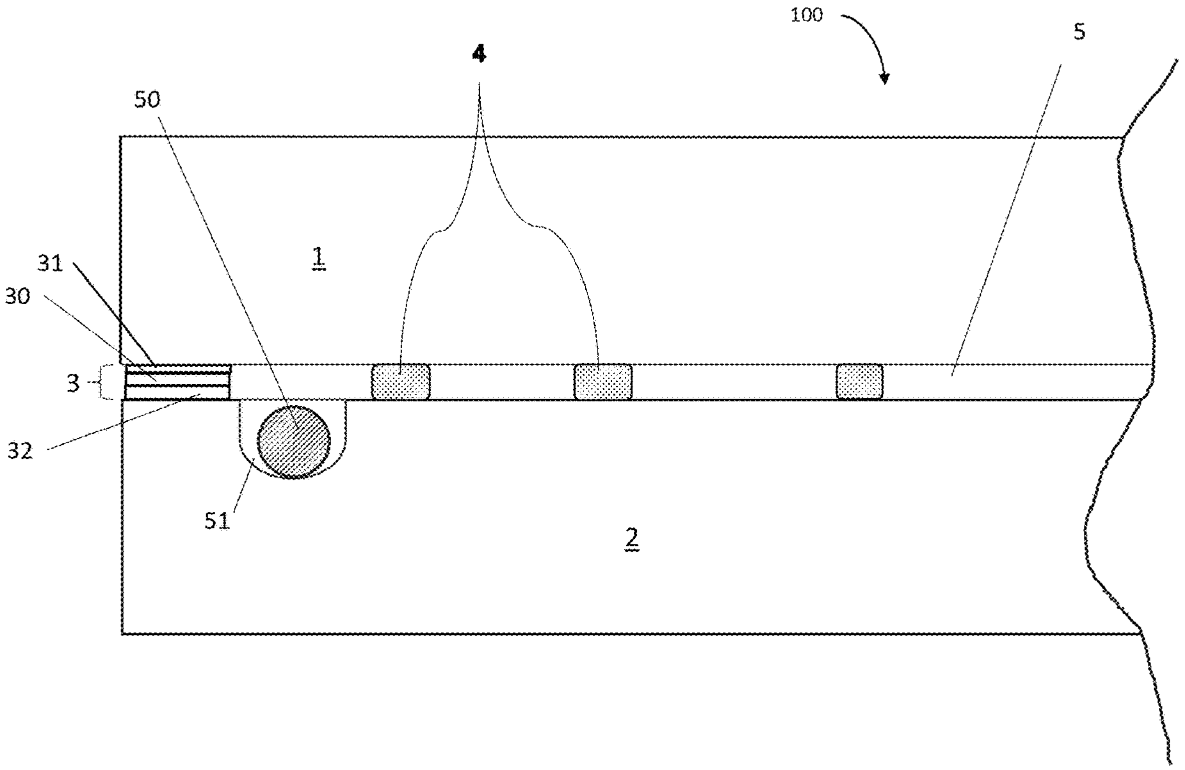
FIG. 5 is a side cross sectional view of a portion of a vacuum insulating unit/panel according to an example embodiment (e.g., which may be the panel of any of FIGS. 1, 2 and/or 4) according to an example embodiment, which may be used in combination with any embodiment herein.

FIG. 4 is a side cross sectional view of a system for measuring the pressure of the evacuated gap 5 of the vacuum insulating panel 100 of any of FIG. 1-3 or 5-9 according to an example embodiment. It should be noted that, in practice, such vacuum insulating panels/units 100 may be oriented upside down or sideways from the orientations illustrated in FIGS. 1-9. Vacuum insulating panel 100 may be used in window applications (e.g., for commercial and/or residential windows), and/or for other applications such as commercial refrigeration and consumer appliance applications.

Referring to FIGS. 1-9, a vacuum insulating panel 100 may include a first substrate 1 (e.g., glass substrate), a second substrate 2 (e.g., glass substrate), a hermetic edge seal 3 at least partially provided proximate the edge of the panel 100, and a plurality (e.g., an array) of spacers 4 provided between at least the substrates 1 and 2 for spacing the substrates from each other and so as to help provide low-pressure space/gap 5 between at least the substrates. Each glass substrate 1, 2 may be flat, or substantially flat, in certain example embodiments. Support spacers 4, sometimes referred to as pillars, may be of any suitable shape (e.g., round, oval, disc-shaped, square, rectangular, rod-shaped, etc.) and may be of or include any suitable material such as stainless steel, aluminum, ceramic, solder glass, metal, and/or glass. Certain example support spacers 4 shown in the figures are substantially circular as viewed from above and substantially rectangular as viewed in cross section, and may have rounded edges. The hermetic edge seal 3 may include one or more of main seal layer 30, upper primer layer 31, and lower primer layer 32. Each "layer" herein may comprise one or more layers. At least one thermal control and/or solar control coating 7, such as a multi-layer low-emittance (low-E) coating, may be provided on at least one of the substrates 1 and 2 in order to further improve insulating properties of the panel. The solar control coating 7 may be provided on substrate 1 or substrate 2, or such a solar control coating may be provided on both substrates 1 and 2. For example, FIGS. 1-4 illustrate such a coating 7 (e.g., low-E coating) provided on substrate 2, although it would be possible to provide the coating 7 on substrate 1. While a low-E coating 7 may (or may not) be provided on a substrate 1 and/or 2 in each embodiment herein, the low-E coating 7 has been omitted from FIGS. 5 and 7-9 for purposes of simplifying these drawings. Each substrate 1 and 2 is preferably of or including glass, but may instead be of other material such as plastic or quartz. For example, one or both glass substrates 1 and 2 may be soda-lime-silica based glass substrates, borosilicate glass substrates, lithia aluminosilicate glass substrates, or the like, and may be clear or otherwise tinted/colored such as green, grey, bronze, or blue tinted. Substrates 1 and 2, in certain example embodiments, may each have a visible transmission of at least about 40%, more preferably of at least about 50%, and most preferably of from about 60-80%. The vacuum insulating panel 100, in certain example embodiments, may have a visible transmission of at least 40%, more preferably of at least 50%, and most preferably of at least 60%. The substrates 1 and 2 may be substantially parallel (parallel plus/minus ten degrees, more preferably plus/minus five degrees) to each other in certain example embodiments. Substrates 1 and 2 may or may not have the same thickness, and may or may not be of the same size and/or same material, in various example embodiments. When glass is used for substrates 1 and 2, each of the glass substrates may be from about 1-12 mm thick, more preferably from about 3-8 mm thick, and most preferably from about 4-6 mm thick. When glass is used for substrates 1 and 2, the glass may or may not be tempered (e.g., thermally tempered). Although thermally tempered glass substrates are desirable in certain environments, the glass substrate(s) 1, 2 may instead be heat strengthened. As known in the art, thermal tempering of glass typically involves heating the glass to a temperature of at least 585 degrees C., more preferably to at least 600 degrees C., more preferably to at least 620 degrees C. (e.g., to a temperature of from about 6209-650 degrees C.), and then rapidly cooling the heated glass so as to compress surface regions of the glass to make it stronger. The glass substrates may be thermally tempered to increase compressive surface stress and to impart safety glass properties including small fragmentation upon breakage. When tempered glass substrates 1 and/or 2 are used, the substrate(s) may be tempered (e.g., thermally or chemically tempered) prior to firing/sintering of main edge seal material 30 (e.g., via laser) to form the edge seal 3.

When heat strengthened glass substrates 1 and/or 2 are used, the substrate(s) may be heat strengthened prior to firing/sintering of the main edge seal material 30 (e.g., via laser) to form the edge seal 3. When a vacuum insulated glass panel/unit 100 has one tempered glass substrate and one heat strengthened substrate, the substrate(s) may be tempered (e.g., thermally or chemically tempered) and heat strengthened prior to firing/sintering of the main edge seal material 30 (e.g., via laser) to form the edge seal 3.

In various example embodiments, each vacuum insulating panel 100, still referring to FIGS. 1-4, optionally may also include at least one sorption getter 8 (e.g., at least one thin film getter) as shown in FIG. 2 for helping to maintain the vacuum in evacuated low pressure space 5 by using reactive material for soaking up and/or bonding to gas molecules that remain in space 5, thus providing for sorption of gas molecules in low pressure space 5. The getter 8 may be provided directly on either glass substrate 1 or 2, or may be provided on a low-E coating 7 in certain example embodiments. In certain example embodiments, the getter 8 may be laser-activated and/or activated using inductive heating techniques, and/or may be positioned in a trough/recess 9 that may be formed in the supporting substrate (e.g., substrate 2) via laser etching, laser ablating, and/or mechanical drilling.

As shown in FIGS. 1-2, vacuum insulating panel 100 may also include a pump-out tube 12 used for evacuating the space 5 to a pressure(s) less than atmospheric pressure, where the elongated pump-out tube 12 may be closed/sealed after evacuation of the space 5. Pump-out seal 13 may be provided around tube 12, and a cap 14 may optionally be provided over the top of the tube 12 after it is sealed. Tube 12 may extend part way through the substrate 1, for example part way through a double countersink hole drilled in the substrate as shown in FIG. 1. However, tube 12 may extend all the way through the substrate 1 in alternative example embodiments. Pump-out tube 12 may be of any suitable material, such as glass, metal, ceramic, or the like. In certain example embodiments, the pump-out tube 12 may be located on the side of the vacuum insulating panel 100 configured to face the interior of the building when the panel is used in a commercial and/or residential window. In certain example embodiments, the pump-out tube 12 may instead be located on the side of the vacuum insulating panel 100 configured to face the exterior of the building. The pump-out tube 12 may be provided in an aperture defined in either substrate 1 or 2 in various example embodiments. Pump-out seal 13 may be of any suitable material. In certain example embodiments, the pump-out seal 13 may be provided in the form of a substantially donut-shaped pre-form which may be positioned in a recess 15 formed in a surface of the substrate 1 or 2, so as to surround an upper portion of the tube 12, so that the pre-form can be laser treated/fired/sintered (e.g., after formation of the edge seal 3) to provide a seal around the pump-out tube 12. Alternatively, the pump-out seal 13 may be of any suitable material and/or may be dispensed in paste and/or liquid form to surround at least part of the tube 12 and may be sealed before and/or after evacuation of space 5. The pump-out seal material 13 may be directly applied to the glass substrate or to a primer layer applied to the glass substrate surface prior to the pump-out seal material being applied to the substrate, in certain example embodiments. After evacuation of space/gap 5, the tip of the tube 12 may be melted via laser to seal same, and hermetic sealing of the space 5 in the panel 100 can be provided both by the edge seal 3 and by the sealed upper portion of the sealed pump-out tube 12 together with seal 13 and/or cap 14. In certain example embodiments, as shown in FIG. 1 for example, the elongated pump-out tube 12 may be substantially perpendicular (perpendicular plus/minus ten degrees, more preferably plus/minus five degrees) to the substrates 1 and 2. Any of the elements/components shown in FIGS. 1-2 may be omitted in various example embodiments.

The evacuated gap/space 5 between the substrates 1 and 2, in the vacuum insulating panel 100, is at a pressure less than atmospheric pressure. For example, after the edge seal 3 has been formed, the cavity 5 evacuated to a pressure less than atmospheric pressure, and the pump-out tube 12 closed/sealed, the gap 5 between at least the substrates 1 and 2 may be at a pressure no greater than about $1.0\times10^{-2}$ Torr, more preferably no greater than about $1.0\times10^{-3}$ Torr, more preferably no greater than about $1.0\times10^{-4}$ Torr, and for example may be evacuated to a pressure no greater than about $1.0\times10^{-6}$ Torr. The gap 5 may be at least partially filled with an inert gas in various example embodiments. In certain example embodiments, the evacuated vacuum gap/space 5 may have a thickness (in a direction perpendicular to planes of the substrates 1 and 2) of from about 100-1,000 μm, more preferably from about 200-500 μm, and most preferably from about 230-350 μm. Providing a vacuum in the gap/space 5 is advantageous as it reduces conduction and convection heat transport, so as to reduce temperature fluctuations inside buildings and the like, thereby reducing energy costs and needs to heat and/or cool buildings. Thus, panels 100 can provide high levels of thermal insulation.

Example low-emittance (low-E) coatings 7 which may be used in the vacuum insulating panel 100 are described in U.S. Pat. Nos. 5,935,702, 6,042,934, 6,322,881, 7,314,668, 7,342,716, 7,632,571, 7,858,193, 7,910,229, 8,951,617, 9,215,760, and 10,759,693, the disclosures of which are all hereby incorporated herein by reference in their entireties. Other low-E coatings may also, or instead, be used. A low-E coating 7 typically includes at least one IR reflecting layer (e.g., of or including silver, gold, or the like) sandwiched between at least first and second dielectric layer(s) of or including materials such as silicon nitride, zinc oxide, zinc stannate, and/or the like. A low-E coating 7 may have one or more of: (i) a hemispherical emissivity/emittance of no greater than about 0.20, more preferably no greater than about 0.04, more preferably no greater than about 0.028, and most preferably no greater than about 0.015, and/or (ii) a sheet resistance ($R_s$) of no greater than about 15 ohms/square, more preferably no greater than about 2 ohms/square, and most preferably no greater than about 0.7 ohms/square, so as to provide for solar control. In certain example embodiments, the low-E coating 7 may be provided on the interior surface of the glass substrate to be closest to the building exterior, which is considered surface two, whereas in other example embodiments the low-E coating 7 may be provided on the interior surface of the glass substrate to be closest to the building interior, which is considered surface three.

Edge seal 3, which may include one or more of ceramic layers 30-32, may be located proximate the periphery or edge of the vacuum insulated panel 100 as shown in FIGS. 1-9. Edge seal 3 may be a ceramic edge seal in certain example embodiments. Referring to FIGS. 1-9, in certain example embodiments, layer 30 of the edge seal may be considered a main or primary seal layer, and layers 31 and 32 may be considered primer layers. One or more of seal layers 30-32, of the edge seal 3, may be of or include ceramic frit in certain example embodiments, and/or may be lead-free or substantially lead-free (e.g., no more than about 15 ppm Pb, more preferably no more than about 5 ppm Pb, even more preferably no more than about 2 ppm Pb) in certain example embodiments. A primer(s) 31 and/or 32 may be omitted in certain example embodiments. In certain example embodiments, primer layers 31 and 32 may be of or include different material(s) compared to the main seal layer 30.

The edge seal 3, in certain example embodiments, may be located at an edge-deleted area (where the solar control coating 7 has been removed) of the substrate as shown in FIGS. 1-9, so as to reduce chances of corrosion. Thus, the edge seal 3 may be positioned so that it does not overlap the low-E coating 7 in certain example embodiments. The edge seal 3 may be located at the absolute edge of the panel 100, or may be spaced inwardly from the absolute edge of the panel 100, in different example embodiments. In certain example embodiments, an outer edge of the hermetic edge seal 3 may be located within about 50 mm, more preferably within about 25 mm, and more preferably within about 15 mm, of an outer edge of at least one of the substrates 1 and/or 2. Thus, an "edge" seal does not necessarily mean that the edge seal 3 is located at the absolute edge or absolute periphery of a substrate(s) or overall panel 100.

In certain example embodiments, in the manufactured vacuum insulating panel 100, the main seal layer 30 of the edge seal 3 may have an average thickness of from about 30-120 μm, more preferably from about 40-100 μm, and most preferably from about 50-85 μm, with an example main seal layer 30 average thickness being from about 60-80 μm. In certain example embodiments, in the manufactured vacuum insulating panel 100, the primer layer 31 of the edge seal 3 may have an average thickness of from about 10-80 μm, more preferably from about 20-70 μm, and most preferably from about 20-55 μm, with an example primer layer 31 average thickness being about 45 μm. In certain example embodiments, in the manufactured vacuum insulating panel 100, the primer layer 32 (opposite the side from which the laser beam for forming the seal layer 30 is directed) of the edge seal 3 may have an average thickness of from about 100-220 μm, more preferably from about 120-200 μm, and most preferably from about 120-170 μm, with an example primer layer 32 average thickness being about 145 μm. In certain example embodiments, the thickness of the main seal layer 30 may be at least about 30 μm thinner (more preferably at least about 45 μm thinner) than the thickness of the primer seal layer 32, and may be at least about 10 μm thicker (more preferably at least about 20 μm, and more preferably at least about 30 μm thicker) than the thickness of the primer seal layer 31. In certain example embodiments, in the manufactured vacuum insulating panel 100, the overall average thickness of the edge seal 3 may be from about 150-330 μm, more preferably from about 200-310 μm, and most preferably from about 240-290 μm, with an example overall edge seal 3 average thickness being about 270 μm. In certain example embodiments, the respective thicknesses of each layer 30, 31, and 32 are substantially the same (the same plus/minus 10%, more preferably plus/minus 5%) along the length of the edge seal 3 around the periphery of the entire panel 100.

Further details of the edge seal structure such as materials therefor, manufacturing techniques thereof, dimensions thereof, characteristics of the edge seal and/or other components, materials, and the manufacture and elements of the overall panel may be found in one or more of U.S. patent application Ser. Nos. 18/376,914, 18/376,473, 18/376,479, 18/376,483, 18/379,275, and 18/510,777, the disclosures of which are all hereby incorporated herein by reference in their entireties.

In certain example embodiments, there is provided a system for measuring the pressure of the evacuated gap 5 inside a sealed vacuum insulating panel, in an efficient manner, including a vacuum insulating panel configured therefor. The pressure of the evacuated gap 5 is indicative of the R-value of the panel 100. Therefore, measuring pressure of the manufactured sealed panel indicates can be used as a quality control factor for demonstrating whether performance of the manufactured sealed panel has a sufficiently low pressure in the evacuated gap (and thus whether it would be expected to have a sufficiently high R-value). In certain example embodiments, the vacuum insulating panel 100 of any of FIGS. 1-9 includes a spinnable sensor body 50 at least partially positioned in at least one recess 51, where the recess 51 is at least partially defined in at least one of the substrates 1 and/or 2 of the panel 100. It can be seen in the figures that the evacuated gap 5 includes the recess(es) 51. The sensor body 50 is placed in the gap/space between the substrates, at least partially in recess(es) 51, before the edge seal is finally sealed and before the space/gap 5 is evacuated. In certain example embodiments, (e.g., see FIGS. 1, 3, 5-7) a sensor body recess 51 may be provided in only one of the substrates, whereas in other example embodiments (e.g., see FIG. 8) sensor body recesses 51 and 51*a* may be provided in both substrates 1 and 2 so as to overlap each other. The sensor body 50 and panel 100 are configured so that the sensor body 50 can remain in the sealed panel 100 for the lifetime of the panel, thereby allowing the pressure in evacuated gap 5 to be measured at any time during the lifetime of the panel 100. This would allow, for example, the pressure in gap/space 5 to be measured years after a window's installation in order to check if the window still has integrity and/or desirable performance such as a sufficiently low pressure in gap/space 5 and thus a sufficiently high R-value.

Sensor body 50 may be of any suitable shape, size and/or material in certain example embodiments. For example, sensor body 50 may be a spinnable and/or rotatable substantially spherical ball, of or including magnetic material, in certain example embodiments (e.g., see FIGS. 1-9). For example, sensor body 50 may be a spinnable and rotatable substantially spherical ball bearing, of or including stainless steel or a stainless steel alloy (e.g., C420, or other 300 or 400 series stainless steel), or other suitable material. Alternatively, sensor body 50 may be of or include another magnetic material such as one or more of nickel, cobalt, ferrite, iron, steel, any alloys thereof, and/or any combination thereof. While sensor body 50 is substantially spherical or spherical in shape in certain example embodiments, it may be of any other suitable shape such as substantially disc-shaped, substantially cylindrical, or substantially oval-shaped, which may also be spinnable and/or rotatable. In certain example embodiments, sensor body 50 is of a material that does not readily oxidize, such as stainless steel or other material(s) mentioned above, so that the surface of the body 50 does not significantly change during manufacturing of the panel 100 which can involve temperature of 300-400 degrees C. or higher. In certain example embodiments, such as when sensor body 50 is made of stainless steel, magnetic material of the sensor body 50 may comprise from about 50-90% Fe, from about 10-30% Cr (more preferably from about 12-15% Cr), from about 0-26% Ni, and from about 0-2% C.

In certain example embodiments, the sensor body 50 may be magnetic. For example, the sensor body 50 may have one or more of: (a) a saturation magnetization (σ) of from about 100-200 (e.g., about 180) $A^2$ m/kg, where A is Amps and m is meters, (b) a magnetic field strength ${}_{M}H_{C}$ of from about 2 to 60 (e.g., from about 3.5 to 4.0) Oe, where Oe is Oersteds, and/or (c) a residual magnetization $M_r$ of from about 0.2 to 7 (e.g., about 0.25) $A^2$ m/kg.

Figure 10:
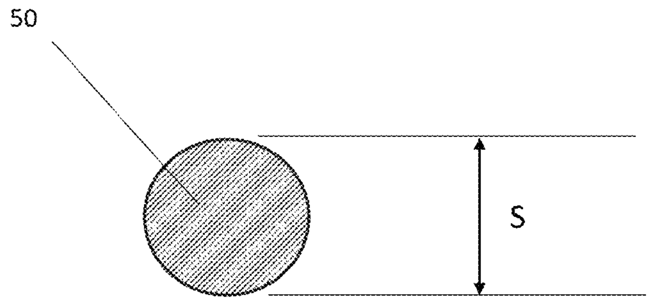
FIG. 10 is a cross-sectional view of an example sensor body which may be used in any embodiment herein.

Sensor body 50, in certain example embodiments (e.g., see FIGS. 1-9), may have a size (e.g., diameter and/or width) of from about 0.35 to 2.0 mm, more preferably from about 0.35 to 1.1 mm, more preferably from about 0.45 to 1.0 mm, more preferably from about 0.50 to 1.0 mm, more preferably from about 0.65 to 0.95 mm, with examples being 0.50 mm and 0.75 mm. Thus, the sensor body 50 is large enough in physical size so that it remains trapped between the substrates 1 and 2, and at least partially in recess 51, during the lifetime of the vacuum insulated panel 100 such that it cannot escape the area of recess 51 and roll around throughout the entirety of evacuated gap/space 5. As mentioned above, in certain example embodiments, the overall average thickness of the edge seal 3, and thus the width/thickness W of the gap 5 as measured directly from substrate 1 to substrate 2, may be from about 150-400 μm, 150-330 μm (0.15 to 0.33 mm), more preferably from about 200-310 μm (0.20 to 0.31 mm), and most preferably from about 240-290 μm (0.24 to 0.29 mm), with an example overall edge seal 3 average thickness being about 270 μm (0.27 mm). Thus, in certain example embodiments, the evacuated space/gap 5 may have a width/thickness (e.g., see W in FIG. 1), measured between the substrates and not including the coating 7, of from about 0.15 to 0.40 mm, more preferably from about 0.15 to 0.33 mm, more preferably from about 0.20 to 0.31 mm, or for example from about 0.25 to 0.30 mm. Accordingly, in certain example embodiments, the sensor body 50 may have a size S (e.g., diameter and/or width) larger than the width W of the space/gap 5 by at least about 0.10 mm, more preferably by at least about 0.20 mm, most preferably by at least about 0.40 mm, so that the body 50 cannot escape the recess 51 area and thus is not free to roll around the entirety of the space/gap 5 during transport, installation, manufacturing, and so forth. In a similar manner, in certain example embodiments, a ratio S/W of the size S (e.g., diameter and/or width) of the sensor body 50 to the width W of the space/gap 5 may be at least about 1.2, more preferably at least about 1.5, and even more preferably at least about 1.75, in certain example embodiments. Note that FIG. 10 is a cross-sectional view of an example sensor body 50 which may be used in any embodiment herein showing an example size (e.g., diameter and/or width).

FIGS. 1-9 illustrate that a recess(es) 51 for housing rotatable/spinnable sensor body 50 is formed in substrate 2 (e.g., a glass substrate). FIGS. 3-9 illustrate various example recesses 51, 51*a* that may be used for the sensor body 50. Recess 51 (which may include just recess 51, just recess 51*a*, or both recesses 51 and 51*a*) may be formed in either substrate 1 or substrate 2 in certain example embodiments in order to house sensor body 50 (e.g., see FIGS. 1-7), or alternatively recesses 51 and 51*a* may be formed in both substrates for housing the sensor body as shown in FIGS. 8-9. Recess(es) 51, 51*a* may be formed by mechanical drilling, etching, by laser, or in any other suitable manner. The recess 51 is preferably formed in only one of the substrates, so that the flat surface of the opposing substrate can help keep the sensor body 50 in a confined area of the panel, but FIG. 8 shows that recesses 51 and 51*a* may be formed in both substrates. In certain example embodiments recess(es) 51, 51*a* is/are formed in the glass substrate prior to thermal tempering or heat strengthening of the glass substrate, and may also be formed through the low-E coating 7 as shown in FIGS. 1 and 3-4. In certain example embodiments, the depth (D) (e.g., see D in FIG. 4) to which the recess(es) 51, 51*a* of FIGS. 1-9 extends from the surface of the substrate 2 into the body of the substrate 2 (e.g., glass substrate) is no more than about 1.2 mm, more preferably no more than about 1.0 mm, more preferably no more than about 0.8 mm, more preferably no more than about 0.50 mm, and most preferably no more than about 0.40 mm, in order to reduce chances of the glass fracturing or being damaged during thermal tempering or heat strengthening. For example, if the depth (D) of a recess 51 and/or 52 is 0.40 mm and a glass substrate (1 or 2) in which it is formed has a glass thickness (GT) of 5 mm, then the ratio D/GT of the recess depth to the glass thickness is 0.08. If a thicker glass substrate is used, then the depth of the recess can be greater while still avoiding glass breakage during thermal tempering, whereas if thinner glass substrate(s) is/are used then a reduced recess thickness may be desirable in certain example embodiments. In certain example embodiments, a ratio D/GT of the recess depth (D) to the glass thickness (GT) of the glass substrate in which the recess is formed may be less than or equal to about 0.25, more preferably less than or equal to about 0.20, more preferably less than or equal to about 0.12, more preferably less than or equal to about 0.10, and most preferably less than or equal to about 0.80.

The recess(es) 51, 51*a* in certain example embodiments, may be positioned from about 10-25 mm, more preferably from about 12-18 mm, in from the closest edge of the panel 100 so that the sensor body 50 can be hidden from view by a window sash after installation of a window, so that desirable aesthetics can be provided. Recess 51 may be formed during the same process and/or by the same device (e.g., drilling, laser, etc.) as the recess 15 for the getter, in certain example embodiments. In various example embodiments, sensor body 50 and recess(es) 51, 51*a* may be located anywhere in the panel, such as near an edge, near the middle as viewed from above, under the pump-out tube 12, or in any other suitable location.

FIG. 2 illustrates that recess 51, as viewed from above, may have a circular shape at the major surface of the substrate in which it is formed. However, as viewed from above, other suitable shapes for the recess(es) 51, 51*a* are possible, such as square, rectangular, oval, or the like. In certain example embodiments, as shown in FIGS. 1-5 and 7, the recess(es) 51, 51*a* may be shaped like the bottom of a teste tube so as to be rounded at the bottom in order to provide stable support to sensor body 50. However, in alternative embodiments, the bottom of recess(es) 51, 51*a* need not be rounded and may instead be flat, angled, or otherwise shaped (e.g., see FIG. 6). The sidewall(s) of the recess(es) 51, 51*a* may be vertically oriented as shown in FIGS. 1 and 3-5 in certain example embodiments, but alternatively may be sloped or stepped for example as shown in FIGS. 6-7. When recess(es) 51, 51*a* has a circular shape as viewed from above, the recess(es) 51, 51*a* may have a diameter at least 10% greater than, more preferably at least 20% greater than, a diameter of the sensor body 50, to provide for sufficient clearance for the sensor body relative to the walls of the recess for allowing the sensor body 50 to rotate/spin without touching the glass substrate during levitation and spinning of the sensor body during pressure measuring procedures. In certain example embodiments, during pressure measuring procedures after the sensor body 50 is levitated by magnets and spun by coils of the measuring apparatus, the spinning sensor body 50 during high speed spinning preferably does not physically contact any of substrate 1, substrate 2, coating 7, or walls of any recess 51, 51*a*.

In certain example embodiments, a bottom surface (flat, angled, rounded, or the like) of the recess 51 and/or 51*a* may have a mean surface roughness, Sa, of from about 2.0 to 50.0 μm, more preferably from about 4.5 to 25 μm, more preferably from about 4.5 to 9.5 μm, more preferably from about 5.0 to 9.0 μm, more preferably from about 5.5 to 8.5 μm, more preferably from about 6.0 to 8.5 μm, and most preferably from about 7.5 to 8.3 μm, to reduce potential physical interference with the sensory body 50. In contrast, uncoated float glass typically has a surface roughness of from about 0.0006 to 0.0008 μm, and is often reported at about 0.0008 μm. As shown in various example embodiments, the recess 51 and/or 51*a* may have at least one of a rounded bottom (e.g., see FIGS. 1, 3-5, 7-8), a flat bottom (e.g., see FIGS. 6, 9), and/or a substantially rectangular shape (e.g., see FIGS. 6, 9) as viewed cross-sectionally While FIGS. 1 and 5-8 show the sensor body 50 resting at the bottom of a recess 51 due to gravity (assuming the panel is positioned as shown in FIGS. 1 and 5-8 and no pressure measuring is begin performed), FIGS. 3-4 and 9 illustrate the sensor body 50 in a levitated position and not contacting any other part of the panel as it is spinning during pressure measuring procedures. After the levitated sensor body 50 is brought up to desirable spinning rate/speed via magnets and coils, the rotational force is turned off and the spin rate of the sensor body 50 begins to slow down. The pressure in space/gap 5 can be calculated based on the deceleration rate of the spinning sensor body 50. The spinning rotor gauge in certain example embodiments, with spinnable sensor body 50 incorporated into the vacuum insulated panel 100, makes it possible to measure pressure within an evacuated, sealed and closed vacuum glazing unit and assure that the unit achieves a specified insulating (e.g., R-value) performance: (a) at the time of manufacture, (b) during and after any environmental testing and/or prior to shipment of the unit to a customer, (c) during any quality control testing, and/or (d) at any time during the lifetime of the panel including but not limited to after the unit has been installed in the field, such as for a window. Given the small size of the sensor body 50, in certain example embodiments the time needed to make a measurement, from the time the sensor body is levitated until a pressure has been detected, may be as short as five minutes or less, more preferably three minutes or less, and possibly one minute or less, which could readily fit within desirable production line speed for the vacuum glazing process. Thus, in certain example embodiments, it may be possible to make go/no-go decisions on product quality (e.g., glazing vacuum integrity) that assures that a final manufactured product meets desired insulating performance (e.g., as indicated by R-value) without adding a significantly time-consuming and/or intrusive process step.

FIG. 4 illustrates a unique spinning rotor gauge sensor system for measuring the pressure in evacuated gap/space 5 of the vacuum insulated panel 100 of any of FIGS. 1-3, 5-9. As viewed in cross section, the system includes a substantially C-shaped head 60 including substantially parallel arm sections 61 and 62 extending from vertically aligned section 63. A portion of the vacuum insulated panel 100 is positioned between arms 61 and 62 of the head 60, with spacers 70 being provided between the head 60 and the panel 100 for mounting and buffering. Spacers 70 may be made of elastic or other insulating material such as rubber, PTFE, any suitable polymer, or the like. Marks (e.g., laser marks), not shown, may be provided on the panel for purposes of aligning the head 60 and panel 100 so that the arms 61, 62 are in the correct position surround the area where sensory body 50 is located in the panel. Head 60 is fitted over the parallel glass substrates 1, 2 of the panel 100 at a location including where the sensor body 50 is located in the panel. Coils and/or magnets 65 in the head 50 levitate the sensor body 50 and then cause the sensor body 50 to rotate/spin at high speeds within the cavity 5 as shown in FIG. 4, at high rotational speed such as from about 400-800 rps. The rotational power of the coils 65 is then switched off and the rate of spin/rotation of the sensor body 50 begins to slow down. The drop in rotational speed of the sensor body is monitored by the sensor head 60 and processor(s) 67. The rate of decay of the rotation speed of the sensor body 50 is a function of the pressure within the evacuated space/gap 5 in which the body 50 is spinning and may also be gas type and/or concentration dependent. At least one processor(s) 67, including processing circuitry, determines a pressure value in the evacuated space/gap 5 based on the drop in rotational speed in the sensor body 50 spinning therein, and may cause the pressure value in the space/gap 5 to be displayed on display 69. Thus, during measurement, the sensor body 50 is levitated by a magnetic field and rotates/spins. When the coils for accelerating the sensor body 50 are turned off, the sensor body 50 is allowed to coast and thus its rotation/spin rate slows down. The sensor body 50 experiences a drag caused by tangential momentum transfer from incident gas molecules inside the evacuated gap where the body 50 is spinning. The angular speed of the sensor body 50 is measured continuously, via at least one sensor, to determine its rate of slowing down. The relative deceleration rate of the ball is proportional to pressure in the evacuated gap/space 5. Thus, the change in rotational speed of the body 50 as it slows down is used to calculate the value of the vacuum/pressure in gap/space 5. Head 60 may then be moved away from the panel 100 after the pressure measurement has been taken.

In an example embodiment, there may be provided a vacuum insulating panel (e.g., 100) comprising: a first substrate (e.g., 1); a second substrate (e.g., 2); a plurality of spacers (e.g., 4) provided in a gap (e.g., 5) between at least the first and second substrates, wherein the gap (e.g., 5) is at pressure less than atmospheric pressure; a seal (e.g., 3) at least partially located between at least the first and second substrates; a sensor body (e.g., 50), comprising magnetic material, at least partially located in a recess (e.g., 51 and/or 51*a*) defined in at least one of the substrates so that the sensor body (e.g., 50) is positioned at least partially between at least the first and second substrates (e.g., 1 and 2); and wherein the sensor body (e.g., 50) is configured to be rotated and/or spun to determine a pressure in the gap (e.g., 5) and/or recess (e.g., 51).

In an example embodiment, there may be provided a vacuum insulating panel (e.g., 100) comprising: a first glass substrate (e.g., 1); a second glass substrate (e.g., 2); a plurality of spacers (e.g., 4) provided in a gap (e.g., 5) between at least the first and second glass substrates, wherein the gap (e.g., 5) is at pressure less than atmospheric pressure; a seal (e.g., 3) at least partially located between at least the first and second glass substrates; a sensor body (e.g., 50), comprising magnetic material, at least partially located between at least the first and second glass substrates; wherein the sensor body (e.g., 50) is configured to be rotated and/or spun to determine a pressure in the gap.

In the vacuum insulating panel of any of the preceding two paragraphs, the sensor body may be at least one of substantially spherical in shape, substantially cylindrical, or substantially disc-shaped.

In the vacuum insulating panel of any of the preceding three paragraphs, the sensor body may be substantially spherical in shape.

In the vacuum insulating panel of any of the preceding four paragraphs, the sensor body may be magnetic.

In the vacuum insulating panel of any of the preceding five paragraphs, the sensor body may comprise at least one of: stainless steel, a stainless steel alloy, nickel, cobalt, iron, or any combination thereof.

In the vacuum insulating panel of any of the preceding six paragraphs, the sensor body may have a size (e.g., diameter and/or width) of from about 0.35 to 2.0 mm, more preferably from about 0.35 to 1.1 mm, more preferably from about 0.45 to 1.0 mm, more preferably from about 0.50 to 1.0 mm, more preferably from about 0.65 to 0.95 mm.

In the vacuum insulating panel of any of the preceding seven paragraphs, the sensor body may have a size (e.g., diameter and/or width) which is larger than a width (W) of the gap between the substrates, so that the sensor body cannot entirely escape an area proximate recess and is not free to roll around an entirety of the gap.

In the vacuum insulating panel of any of the preceding eight paragraphs, the sensor body may have a size (e.g., diameter and/or width) which is at least about 0.20 mm larger, more preferably at least about 0.40 mm larger, than a width (W) of the gap between the substrates.

In the vacuum insulating panel of any of the preceding nine paragraphs, a depth (D) to which the recess extends into the substrate in which it is provided may preferably be no more than about 1.2 mm, more preferably no more than about 0.8 mm, more preferably no more than about 0.50 mm, and most preferably no more than about 0.40 mm.

In the vacuum insulating panel of any of the preceding ten paragraphs, at least a portion of the recess may be located within about 25 mm (e.g., from about 10-25 mm, more preferably from about 12-18 mm from) of an edge of at least one of the substrates.

In the vacuum insulating panel of any of the preceding eleven paragraphs, the recess may have at least one of a rounded bottom, a flat bottom, and/or a substantially rectangular shape as viewed cross-sectionally.

In the vacuum insulating panel of any of the preceding twelve paragraphs, the recess may have a size (e.g., diameter and/or width) at least about 2%, more preferably at least about 10%, greater than a diameter (e.g., size and/or width) of the sensor body.

In the vacuum insulating panel of any of the preceding thirteen paragraphs, the sensor body may consist of, or consist essentially of, a ball of or including stainless steel.

In the vacuum insulating panel of any of the preceding fourteen paragraphs, the vacuum insulating panel may be configured for use in a window. The sensor body may be configured to be at least partially hidden from a normal view by a sash of the window.

In the vacuum insulating panel of any of the preceding fifteen paragraphs, the seal may be an edge seal and may comprise at least one layer.

In the vacuum insulating panel of any of the preceding sixteen paragraphs, the substrates may be glass substrates.

In the vacuum insulating panel of any of the preceding seventeen paragraphs, the substrates may be thermally tempered or heat strengthened glass substrates.

In the vacuum insulating panel of any of the preceding eighteen paragraphs, the recess may include a single recess formed in one of the substrates, or two overlapping recesses formed in the first and second substrates, respectively.

In the vacuum insulating panel of any of the preceding nineteen paragraphs, a bottom surface of the recess may have a mean surface roughness, Sa, of from about 2.0 to 50.0 μm, more preferably from about 4.5 to 25 μm, more preferably from about 4.5 to 9.5 μm.

In the vacuum insulating panel of any of the preceding twenty paragraphs, a ratio D/GT of the recess depth (D) to a glass thickness (GT) of a substrate in which the recess is formed may be less than or equal to about 0.25, more preferably less than or equal to about 0.20, more preferably less than or equal to about 0.12, more preferably less than or equal to about 0.10, and most preferably less than or equal to about 0.08.

In the vacuum insulating panel of any of the preceding twenty-one paragraphs, a ratio S/W may be at least about 1.2, more preferably at least about 1.5, and possibly at least about 1.75, where S is a diameter and/or width size of the sensor body and W is a width and/or thickness of the gap as measured from the first substrate to the second substrate.

In the vacuum insulating panel of any of the preceding twenty-two paragraphs, a composition of the sensor body may comprise from about 50-90% Fe and from about 10-30% Cr (wt. %).

There may be provided a method of determining pressure in a vacuum insulating panel of any of the preceding twenty-three paragraphs, wherein the method may comprise: levitating and spinning the sensor body, comprising magnetic material, located at least partially in a recess defined in at least one of the substrates so as to spin the sensor body in a location which is exposed to the gap and which is at least partially provided in the recess; allowing the spinning of the sensor body to slow down; and determining a pressure in the gap and/or recess of the vacuum insulated panel based on at least a rate at which the spinning of sensor body slows down and/or decelerates. The levitating and spinning the sensor, of the method, may be performed using a plurality of coils and a plurality of magnets.

It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). Terms, such as "first", "second", and the like, may be used herein to describe various components. Each of these terminologies is not used to define an essence, order or sequence of a corresponding component but used merely to distinguish the corresponding component from other component(s). For example, a "first" component may be referred to as a "second" component, and similarly, the "second" component may be referred to as the "first" component. "Or" as used herein may cover both "and" and "or."

It should be noted that if it is described that one component is "connected", "coupled", or "joined" to another component, at least a third component(s) may be "connected", "coupled", and "joined" between the first and second components, although the first component may be directly connected, coupled, or joined to the second component. Thus, terms such as "connected" and "coupled" cover both direct and indirectly connections and couplings.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or populations thereof.

The word "about" as used herein means the identified value plus/minus 5%.

"On" as used herein covers both directly on, and indirectly on with intervening element(s) therebetween. Thus, for example, if element A is stated to be "on" element B, this covers element A being directly and/or indirectly on element B. Likewise, "supported by" as used herein covers both in physical contact with, and indirectly supported by with intervening element(s) therebetween.

Each embodiment herein may be used in combination with any other embodiment(s) described herein.

While the disclosure has been illustrated and described with reference to various example embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in combination with any other embodiment(s) described herein.

The invention claimed is:

1. A vacuum insulating panel comprising:

a first substrate;

a second substrate;

a plurality of spacers provided in a gap between at least the first and second substrates, wherein the gap is at pressure less than atmospheric pressure;

a seal at least partially located between the first and second substrates; and a sensor body, comprising magnetic material, at least partially located in a recess defined in at least one of the substrates so that the sensor body is positioned between at least the first and second substrates;

wherein the sensor body is configured to be rotated to determine a pressure in the gap;

wherein the sensor body has a size, diameter or width, which is larger than a width (W) of the gap between the substrates, so that the sensor body cannot entirely escape an area proximate the recess and is not free to roll around an entirety of the gap.

2. The vacuum insulating panel of claim 1, wherein the sensor body is spherical or cylindrical.

3. The vacuum insulating panel of claim 1, wherein the sensor body is spherical.

4. The vacuum insulating panel of claim 1, wherein the sensor body is magnetic.

5. The vacuum insulating panel of claim 1, wherein the sensor body comprises at least one of: stainless steel, a stainless steel alloy, nickel, cobalt, iron, or any combination thereof.

6. The vacuum insulating panel of claim 1, wherein the sensor body has a size, diameter or width, of from about 0.35 to 2.0 mm.

7. The vacuum insulating panel of claim 1, wherein the sensor body has a size, diameter or width, which is at least about 0.20 mm larger than W.

8. The vacuum insulating panel of claim 1, wherein the sensor body has a size, diameter or width, which is at least about 0.40 mm larger than W.

9. The vacuum insulating panel of claim 1, wherein a depth (D) to which the recess extends into the substrate in which it is provided is no more than about 0.8 mm.

10. The vacuum insulating panel of claim 1, wherein a depth (D) to which the recess extends into the substrate in which it is provided is no more than about 0.50 mm.

11. The vacuum insulating panel of claim 1, wherein at least a portion of the recess is located within about 25 mm of an edge of at least one of the substrates.

12. The vacuum insulating panel of claim 1, wherein at least a portion of the recess is located from about 12-18 mm from an edge of at least one of the substrates.

13. The vacuum insulating panel of claim 1, wherein the recess has at least one of a rounded bottom, a flat bottom, and a substantially rectangular shape, as viewed cross-sectionally.

14. The vacuum insulating panel of claim 1, wherein the recess has a size, diameter or width, at least about 2% greater than a diameter, size or width, of the sensor body.

15. The vacuum insulating panel of claim 1, wherein the sensor body is a ball comprising stainless steel.

16. The vacuum insulating panel of claim 1, wherein the vacuum insulating panel is configured for use in a window.

17. The vacuum insulating panel of claim 16, wherein the sensor body is configured to be at least partially hidden from a normal view by a sash of the window.

18. The vacuum insulating panel of claim 1, wherein the seal is an edge seal and comprises at least one layer.

19. The vacuum insulating panel of claim 1, wherein the substrates are glass substrates.

20. The vacuum insulating panel of claim 19, wherein the substrates are heat strengthened or thermally tempered glass substrates.

21. The vacuum insulating panel of claim 1, wherein a bottom surface of the recess has a mean surface roughness, Sa, of from about 2.0 to 50.0 μm.

22. The vacuum insulating panel of claim 1, wherein a bottom surface of the recess has a mean surface roughness, Sa, of from about 4.5 to 25 μm.

23. The vacuum insulating panel of claim 1, wherein the recess comprises a first recess formed in the first substrate and a second recess formed in the second substrate, wherein the first and second recesses overlap each other.

24. The vacuum insulating panel of claim 1, wherein a ratio D/GT of a depth (D) of the recess to a glass thickness (GT) of a substrate in which the recess is formed is less than or equal to about 0.2.

25. The vacuum insulating panel of claim 1, wherein a ratio D/GT of a depth (D) of the recess to a glass thickness (GT) of a substrate in which the recess is formed is less than or equal to about 0.1.

26. The vacuum insulating panel of claim 1, wherein a ratio S/W is at least about 1.2, where S is a diameter or width size of the sensor body.

27. The vacuum insulating panel of claim 26, wherein the ratio S/W is at least about 1.5.

28. The vacuum insulating panel of claim 1, wherein a composition of the sensor body comprises from about 50-90% Fe and from about 10-30% Cr.

29. A vacuum insulating panel comprising:

a first glass substrate;

a second glass substrate;

a plurality of spacers provided in a gap between at least the first and second glass substrates, wherein the gap is at pressure less than atmospheric pressure;

a seal at least partially located between at least the first and second glass substrates; and a sensor body, comprising magnetic material, located between the first and second glass substrates;

wherein the sensor body is configured to be rotated to determine a pressure in the gap;

wherein the sensor body is at least partially located in a recess defined in at least one of the substrates;

wherein the sensor body has a size, diameter or width, which is larger than a width (W) of the gap between the substrates, so that the sensor body cannot entirely escape an area proximate the recess and is not free to roll around an entirety of the gap.

30. The vacuum insulating panel of claim 29, wherein the sensor body is spherical.

31. The vacuum insulating panel of claim 29, wherein the sensor body comprises at least one of: stainless steel, a stainless steel alloy, nickel, cobalt, iron, or any combination thereof.

32. The vacuum insulating panel of claim 29, wherein the sensor body has a size, diameter and/or width, of from about 0.35 to 1.1 mm.

33. The vacuum insulating panel of claim 29, wherein the sensor body has a size, diameter or width, which is at least about 0.20 mm larger than W.

34. The vacuum insulating panel of claim 29, wherein the sensor body consists of a spinnable stainless-steel ball.

35. The vacuum insulating panel of claim 29, wherein a ratio S/W is at least about 1.2, where S is a diameter or width size of the sensor body.

36. The vacuum insulating panel of claim 35, wherein the ratio S/W is at least about 1.5.

37. The vacuum insulating panel of claim 29, wherein a composition of the sensor body comprises from about 50-90% Fe and from about 10-30% Cr.

38. A method of determining pressure in a vacuum insulating panel comprising: a first substrate, a second substrate, a plurality of spacers provided in a gap between at least the first and second substrates, wherein the gap is at pressure less than atmospheric pressure, and a seal at least partially located between at least the first and second substrates, the method comprising:

levitating and spinning a sensor body, comprising magnetic material, located at least partially in a recess defined in at least one of the substrates so as to spin the sensor body in a location which is exposed to the gap and which is at least partially provided in the recess;

allowing the spinning of the sensor body to slow down; and determining a pressure in the gap of the vacuum insulated panel based on at least a rate at which the spinning of sensor body slows down wherein the sensor body has a size, diameter or width, which is larger than a width (W) of the gap between the substrates, so that the sensor body cannot entirely escape an area proximate the recess and is not free to roll around an entirety of the gap.

39. The method of claim 38, wherein the sensor body is spherical or cylindrical.

40. The method of claim 38, wherein the sensor body is substantially spherical in shape.

41. The method of claim 38, wherein the sensor body is magnetic.

42. The method of claim 38, wherein the sensor body comprises at least one of:

stainless steel, a stainless steel alloy, nickel, cobalt, iron, or any combination thereof.

43. The method of claim 38, wherein the sensor body has a size, diameter or width, of from about 0.35 to 1.1 mm.

44. The method of claim 38, wherein the sensor body has a size, diameter or width, which is at least about 0.20 mm larger than W.

45. The method of claim 38, wherein the sensor body has a size, diameter or width, which is at least about 0.40 mm larger than W.

46. The method of claim 38, wherein a depth (D) to which the recess extends into the substrate in which it is provided is no more than about 1.2 mm.

47. The method of claim 38, wherein a depth (D) to which the recess extends into the substrate in which it is provided is no more than about 0.50 mm.

48. The method of claim 38, wherein at least a portion of the recess is located with about 25 mm from an edge of at least one of the substrates.

49. The method of claim 38, wherein at least a portion of the recess is located from about 12-18 mm from an edge of at least one of the substrates.

50. The method of claim 38, wherein the recess has a rounded bottom or a flat bottom as viewed cross-sectionally.

51. The method of claim 38, wherein the recess has a size, diameter or width, at least about 10% greater than a diameter, size or width, of the sensor body.

52. The method of claim 38, wherein the sensor body is a ball comprising stainless steel.

53. The method of claim 38, wherein the substrates are glass substrates.

54. The method of claim 38, wherein the substrates are thermally tempered or heat strengthened glass substrates.

55. The method of claim 38, wherein said levitating and spinning the sensor is performed using a plurality of coils and a plurality of magnets.

56. A system for measuring pressure in an evacuated gap of a vacuum insulating panel, the system comprising:

a substantially C-shaped head comprising coils and magnets and first and second arms, wherein the first and second arms are configured to be located on opposite sides of a portion of a vacuum insulating panel comprising first and second substantially parallel substrates with a gap therebetween at pressure less than atmospheric pressure;

wherein at least one of the coils and/or magnets are configured to levitate and spin a sensor body, comprising magnetic material, located in the gap between the substrates;

wherein the sensor body has a size, diameter or width, which is larger than a width (W) of the gap between the substrates, so that the sensor body cannot entirely escape an area proximate the recess and is not free to roll around an entirety of the gap; and at least one processor, comprising processing circuitry, individually and/or collectively configured to determine a pressure in the gap and of the vacuum insulated panel based on at least a rate at which spinning of sensor body slows down.

57. The apparatus of claim 56, further comprising a display, wherein the at least one processor is individually or collectively configured to cause the determined pressure to be displayed on the display.

* * * * *